(No Model.)

D. W. DAVIS.
RAIL BRAKE.

No. 581,270. Patented Apr. 27, 1897.

Attest:
F. H. Schott
Jno. J. Curtis

Inventor
David W. Davis
By W. A. Ruff atty

UNITED STATES PATENT OFFICE.

DAVID W. DAVIS, OF DETROIT, MICHIGAN.

RAIL-BRAKE.

SPECIFICATION forming part of Letters Patent No. 581,270, dated April 27, 1897.

Application filed February 10, 1897. Serial No. 622,775. (No model.)

*To all whom it may concern:*

Be it known that I, DAVID W. DAVIS, a citizen of the United States, residing at Detroit, in the county of Wayne and State of Michigan, have invented certain new and useful Improvements in Rail-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in car-brakes, and more particularly the class of brakes known as "rail-brakes."

The object of the invention is to provide a brake of this character which will be so connected and applied as to have the entire weight of the car as a fulcrum-weight.

With these ends in view my invention consists in the certain features of construction and combinations of parts, as will be hereinafter fully described, and pointed out in the claims.

Figure 1:
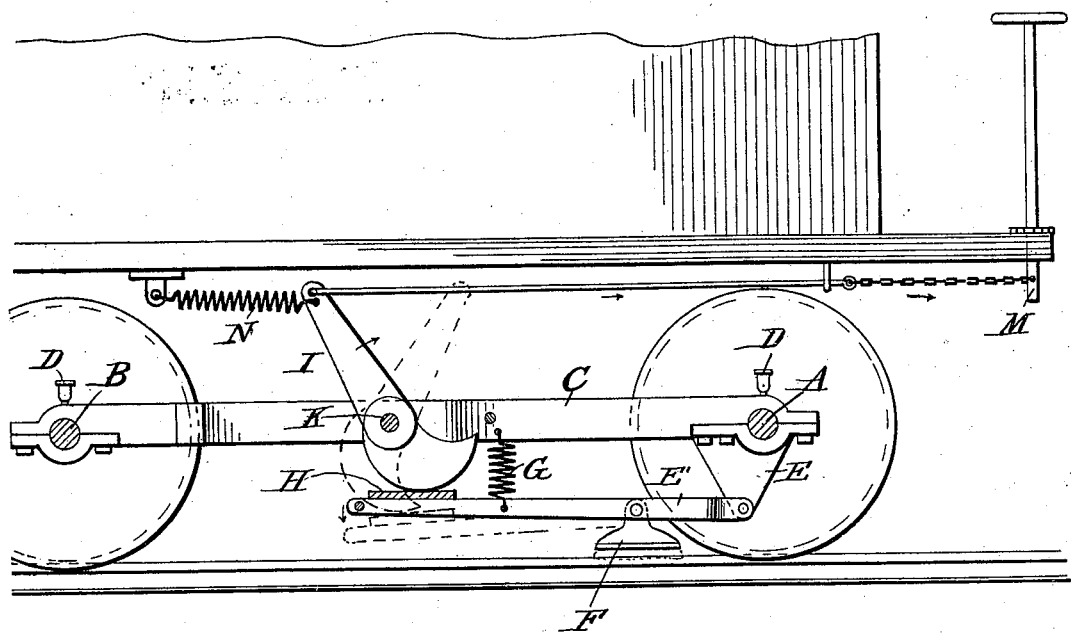
Figure 2:
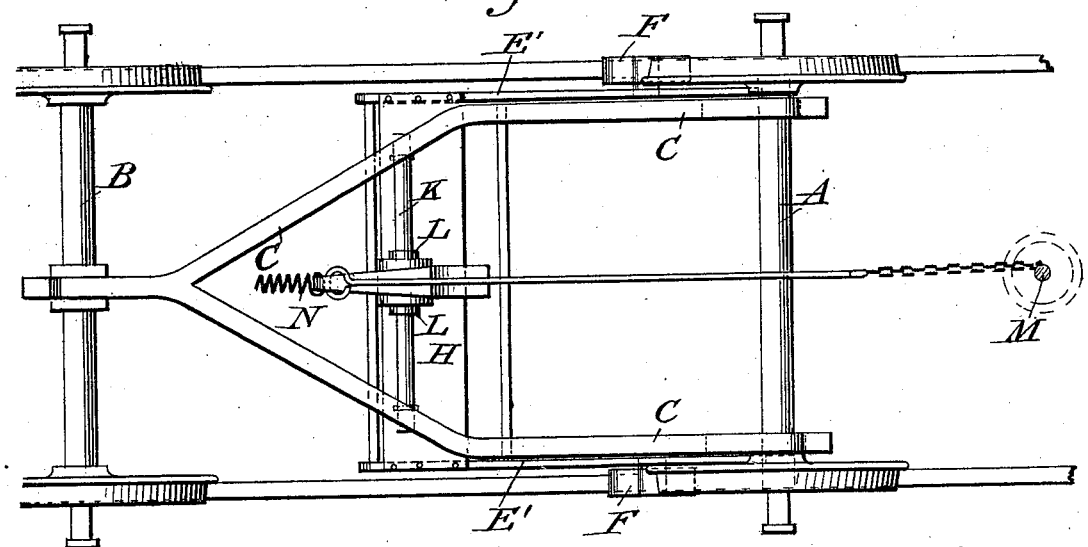

In the accompanying drawings, Figure 1 is a side view of my invention, and Fig. 2 is a top plan view of the same.

A and B represent the respective front and rear axles of a car to which is journaled the bifurcated brace and support C, having suitable oil-cups D connected therewith. To the bifurcated ends of said brace C are secured the brackets E, in which are pivoted the ends of the lever-rods E', near the forward end of which are pivoted the brake-shoes F.

G represents coil-springs secured to the lever-bars E' and the support C on each side thereof for the purpose of holding the lever and brake-shoes away from the rails.

H represents a flat cam-bar connecting the lever-rods E'. A cam-lever I is journaled on a rod K in suitable collars L to prevent lateral movement thereof, the said cam being so adjusted as to be in constant contact with the bar H, the said rod K being fixed in the arms of the support C. To the upper end of the cam-lever I is secured a rod or chain connecting with the brake-rod M. A coil-spring N, extending rearwardly, is also secured to the lever I to remove the cam from the cam-bar H.

In operation it will be seen that when the cam-lever is brought forward it engages the cam-bar H, thereby forcing the brake-shoes on the rail.

Having thus fully described my invention, what I claim as new, and desire to secure by Letters Patent, is—

1. In a car, the combination with the axles, the bifurcated brace or support journaled thereon, and the brackets secured thereto, of the lever-rods, pivoted to said brackets, the depending brake-shoes pivotally connected with said levers, the transverse bar connecting the free ends of said lever-rods, the cam-lever bearing upon said bar and means for normally holding the brake-shoes away from the rails, substantially as described.

2. In a car, the combination with the axles, the bifurcated brace or support journaled thereon, and the brackets secured thereto, of the lever-rods pivoted to said brackets, the depending brake-shoes pivotally connected with said lever-rods, the coiled springs secured to said lever-rods and to the brace, the transverse bar connecting the free ends of said lever-rods, the rod secured to said brace, the cam-lever journaled thereon bearing upon said bar, and the coiled spring secured to said lever, substantially as described.

In testimony whereof I have affixed my signature in presence of two witnesses.

DAVID W. DAVIS.

Witnesses:
S. G. HOPKINS,
R. D. WHITE.